(12) United States Patent
Messick et al.

(10) Patent No.: US 12,055,987 B2
(45) Date of Patent: Aug. 6, 2024

(54) SYSTEM AND METHOD FOR THERMAL MANAGEMENT OF MULTI-ENCLOSURE SYSTEM

(71) Applicant: Dell Products L.P., Round Rock, TX (US)

(72) Inventors: Douglas Evan Messick, Austin, TX (US); Richard Mark Eiland, Austin, TX (US); Alaric Joaquim Narcissius Silveira, Austin, TX (US); Jonathan David Brown, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 372 days.

(21) Appl. No.: 17/722,565

(22) Filed: Apr. 18, 2022

(65) Prior Publication Data

US 2023/0333612 A1    Oct. 19, 2023

(51) Int. Cl.
*G06F 1/20* (2006.01)
*G06F 1/18* (2006.01)
*G06F 11/07* (2006.01)
*G06F 11/30* (2006.01)

(52) U.S. Cl.
CPC ............. *G06F 1/206* (2013.01); *G06F 1/181* (2013.01); *G06F 11/0754* (2013.01); *G06F 11/3058* (2013.01); *G06F 2201/81* (2013.01)

(58) Field of Classification Search
CPC ..... G06F 1/32; G06F 1/12; G06F 9/44; G06F 1/20
See application file for complete search history.

(56) References Cited

U.S. PATENT DOCUMENTS

| 7,640,760 | B2 * | 1/2010 | Bash | G05D 23/1931 |
| | | | | 713/300 |
| 2014/0261369 | A1 * | 9/2014 | Tyler | F24C 15/006 |
| | | | | 126/1 F |
| 2020/0410059 | A1 * | 12/2020 | Barnette | G06F 1/20 |

* cited by examiner

*Primary Examiner* — Keshab R Pandey
(74) *Attorney, Agent, or Firm* — Womble Bond Dickinson (US) LLP

(57) ABSTRACT

Methods and systems for thermal management are disclosed. The thermal management method and systems may reduce the likelihood of a data processing system exceeding thermal limits even in cases of highly customizable and modifiable data processing system. To reduce the likelihood of the data processing system failing to meet thermal limits, the data processing system may implement a distributed thermal management system. The distributed thermal management system may include multiple components that are responsible for granular and/or global thermal management of the data processing system.

20 Claims, 9 Drawing Sheets

SYSTEM AND METHOD FOR THERMAL MANAGEMENT OF MULTI-ENCLOSURE SYSTEM

FIELD OF THE DISCLOSURE

Embodiments disclosed herein generally relate to thermal management. More particularly, embodiments disclosed herein relate to systems and methods to manage thermal states of highly customizable systems.

BACKGROUND

Computing devices may store data and used stored data when performing computations. For example, computing devices may utilize data when providing computer implemented services. To provide the computer implemented services, the computing devices may consume electrical power to perform the computations. The electrical power may be obtained from a variety of sources.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
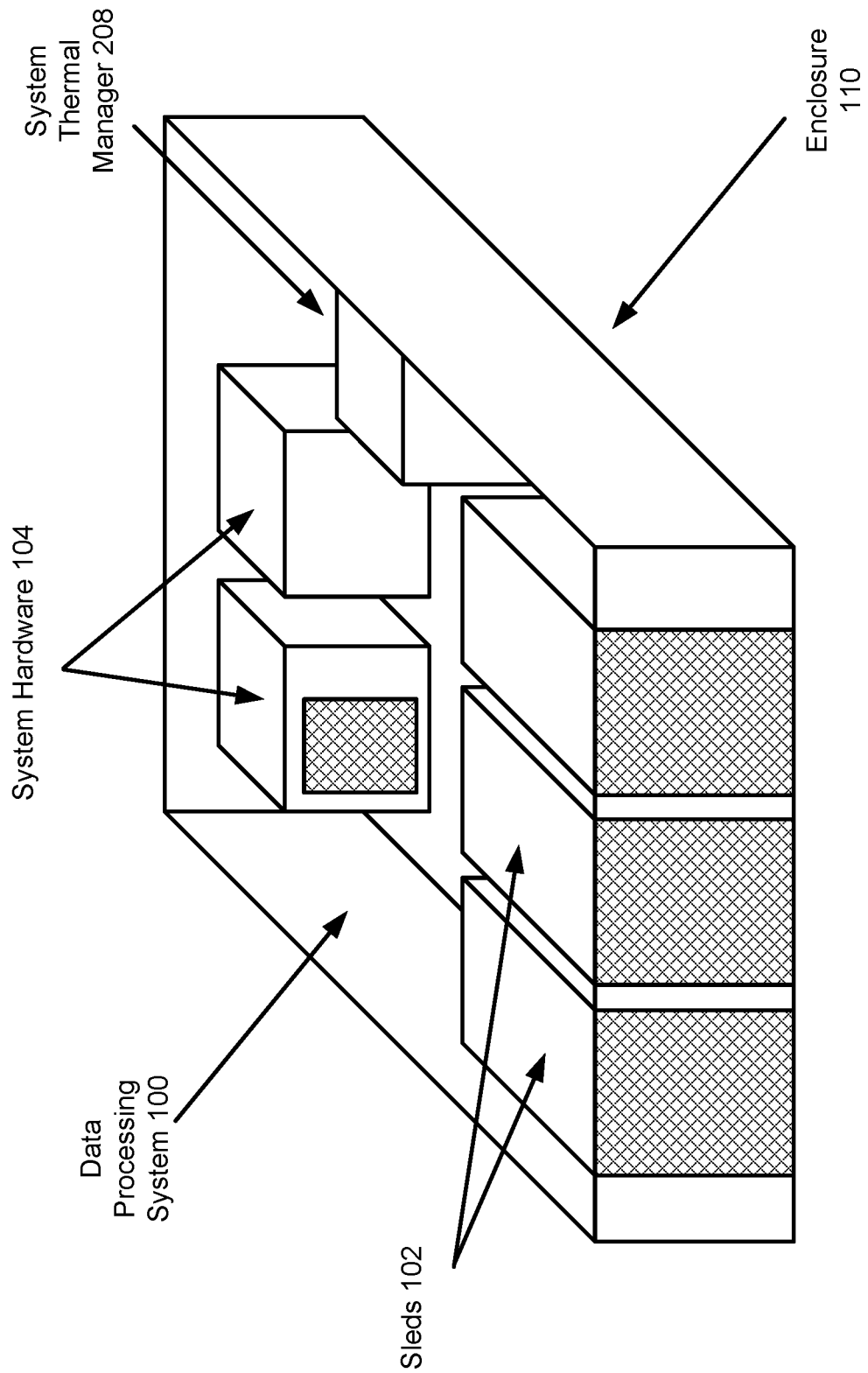
FIG. 1 shows a diagram illustrating a system in accordance with an embodiment.

Various embodiments and aspects of the disclosure will be described with reference to details discussed below, and the accompanying drawings will illustrate the various embodiments. The following description and drawings are illustrative of the embodiments and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for thermal management. Specifically, the disclosed thermal management method and systems may reduce the likelihood of a data processing system exceeding thermal limits even in cases of highly customizable and modifiable data processing system.

To reduce the likelihood of the data processing system failing to meet thermal limits, the data processing system may implement a distributed thermal management system. The distributed thermal management system may include multiple components that are responsible for granular and/or global thermal management of the data processing system.

For example, the data processing system may include local thermal managers that are responsible for identifying and managing the thermal states of various portions of hardware resources of the data processing device. The data processing system may also include a system thermal manager that cooperates with the local thermal managers to manage the thermal state of the system.

To manage the thermal states, both the local and system level thermal managers may cooperate to identify granular (e.g., sled level) and system wide (e.g., enclosure level) thermal limits. Once identified, these thermal limits may be used to manage the operation of the data processing system. For example, when these thermal limits are exceeded, the various thermal managers may perform remedial action to address the exceeded thermal limits.

By doing so, a data processing system in accordance with embodiments disclosed herein may facilitate thermal management of highly customizable systems and that which may be changed over time.

In an embodiment, a method of thermal management by a data processing system is provided. The method may include obtaining a sled thermal characteristics package from a local thermal manager of each sled of a plurality of sleds of the data processing system; when all of the obtained sled thermal characteristics packages comprise an airflow impedance, identifying a maximum airflow rate each sled of the plurality of sleds will receive from thermal management hardware of the data processing system using the airflow impedance from each of the obtained sled thermal characteristics packages; when at least one of the obtained sled thermal characteristics packages does not comprise the airflow impedance, identifying the maximum airflow rate each sled of the plurality of sleds will receive from the thermal management hardware using a worst case airflow impedance for each sled of the plurality of sleds; notifying the local thermal manager of each respective sled of the corresponding identified maximum airflow rate; obtaining a maximum supported airflow temperature from the local thermal manager of each sled of the plurality of sleds, the maximum supported airflow temperature being based, at least in part, on the identified maximum airflow rate corresponding to the respective sled; obtaining a maximum supported airflow temperature for the data processing system based on the obtained maximum supported airflow temperature from the local thermal manager of each sled of the plurality of sleds; and thermally managing the data processing system based on the maximum supported airflow temperature.

The method may also include obtaining, by a local thermal manager of each sled, the corresponding maximum airflow rate from the system thermal manager; obtaining, by the local thermal manager of each sled, the maximum supported airflow temperature for the respective sled of the plurality of sleds based on the corresponding maximum airflow rate and computing resources of the respective sled of the plurality of sleds; and thermally managing, by the local thermal manager of each sled, the respective sled of the plurality of sleds based on the maximum supported airflow temperature.

Thermally managing the data processing system based on the maximum supported airflow temperature may include monitoring a temperature of airflow through the data processing system, the airflow being generated, at least in part, by the thermal management hardware; and performing remedial action when the temperature exceeds a first threshold.

The remedial action may include sending alerts based on a degree of the temperature exceeding the first threshold.

Thermally managing the respective sled of the plurality of sleds based on the maximum supported airflow temperature may include monitoring, by the local thermal manager of each sled, a temperature of a portion of the airflow through the respective sled of the plurality of sleds; and performing, by the local thermal manager of each sled, sled level remedial action when the temperature of the portion of the airflow exceeds a second threshold.

The sled level remedial action may include reducing a rate of thermal generating by the computing resources of the respective sled.

The local thermal manager of each sled of the plurality of sleds may include separate computing resources that operate independently from the computing resources of the respective sled, and the computing resources of each sled operate as an independent computing device.

Each sled of the plurality of sleds may include a sub-enclosure positioned inside of an enclosure of the data processing system, the sub-enclosures relying, at least in part, on the thermal management hardware for thermal dissipation from an interior of the respective sub-enclosure.

In an embodiment, a non-transitory computer readable medium storing instructions that, when executed by a processor, cause a method as discussed above to be performed is provided.

In an embodiment, a data processing system that performs the method as discussed above is provided.

Turning to FIG. 1, a diagram illustrating a system in accordance with an embodiment is shown. The system shown in FIG. 1 may be used to provide computer implemented services. The system may include, but is not limited to, data processing system 100 and enclosure 110. Each of these components is discussed below.

Data processing system 100 may provide the computer implemented services. When doing so, data processing system 100 may consume electrical power and generate heat. The components of the data processing system may have limits on their operational ranges. For example, if the temperature of various components exceeds certain limits, the components may not operate nominally (e.g., in a manner expected). Consequently, to provide the computer implemented services, data processing system 100 may manage the thermal states of its various components. To provide the computer implemented services and manage the thermal states of its components, data processing system 100 may include sleds 102 and system hardware 104.

Sleds 102 may include sub-enclosures positioned within enclosure 110. These sub-enclosures may be easily added to and/or removed from enclosure 110. Hardware resources may be positioned within each sub-enclosure. Sleds 102 may utilize services provided by system hardware 104 to provide the computer implemented services. For example, sleds 102 may utilize power distribution and cooling services provided by system hardware 104. Sleds may utilize other services provided by system hardware 104 without departing from embodiments disclosed herein. By utilizing these services provided by system hardware 104, each of sleds 102 may not need to include hardware for these services (e.g., shared by sleds 102). By doing so, a data processing system 100 with customized capabilities may be obtained by adding, removing, and/or changes the sleds positioned in enclosure 110.

For example, the hardware resources of each of sleds 102 may include any number of physical devices (e.g., processors, memory modules, storage devices, communications devices, etc.) that provide computing resources (e.g., processor cycles, transitory storage, persistent storage, communications bandwidth, etc.) usable to provide computer implemented services. The computing resources may be used to support applications (e.g., computing instructions executing with the computing resources) hosted by data processing system 100. The applications may provide the computer implemented services. The computer implemented services may include any type and quantity of computer implemented services such as, for example, database services, data storage services, electronic communications services, etc. Different sleds may include similar and/or different types and/or quantities of physical devices. Consequently, modifying the type/quantity of sleds positioned in enclosure 110 may enables the type/quantity of hardware resources available to data processing system 100 to be customized.

When operating, the hardware resources of each sled may consume electrical power. The hardware resources may utilize power from system hardware 104, which may include, for example, power supplies for providing power, airflow control components such as fans for managing the thermal environment inside of enclosure 110, thermal environment monitoring devices such as temperature sensors, etc.

Similarly, when operating, the hardware resources of each sled 102 may be thermally managed using airflow provided, at least in part, by system hardware 104. For example, system hardware 104 may include fans that cause gasses to flow through the interior of enclosure 110. In FIG. 1, the areas filled with cross hatching indicate gratings or other structures through which gasses may flow. For example, fans or other active components may be positioned in system hardware 104 which may cause gasses to flow throughout enclosure 110 and the sub-enclosures of sleds 102.

However, the rate of gas flow through any of sleds 102 due to the flow generated by system hardware 104 may depend (i) on the type and arrangement of components within the respective sled, (ii) the type and arrangement of components within other sleds, and (iii) the type and quantity of airflow generation components of system hardware 104. For example, the type and arrangement of components within a sled may determine the relative impedance to the flow of gasses (e.g., the relative airflow impedance (RAI)) of the respective sled. Likewise, the type and quantity of airflow generation components of system hardware 104 may increase or decrease the total available airflow generation capacity of the system.

In general, embodiments disclosed herein may provide systems, devices, and/or methods for managing the thermal environment of a data processing system. To manage the thermal environment of the data processing system, the data processing system may take into account the unique (or generalized) characteristics of each sled when managing its thermal environment. To do so, a distributed thermal management system may be implemented where a system thermal manager 208 is responsible for managing the overall thermal environment of the data processing system while local thermal managers of each sled are response for managing the sub-thermal environment of each sled. By doing so, a data processing system in accordance with an embodiment may manage its thermal environment even when various sleds are replaced with other sleds and various sleds have markedly different characteristics (e.g., different components positioned therein resulting in varying RAIs). Accordingly, the data processing system may be more likely to be able to provide desired computer implemented services by, for example, avoiding the components positioned within sleds 102 from exceeding their thermal limits. For additional details regarding system thermal manager 208 and local thermal managers, refer to FIGS. 2A-2C.

Enclosure 110 may include a physical structure for housing data processing system 100. The physical structure may be a form factor compliant structure such as, for example, a rack mount enclosure for a server. The physical structure may be other types of structures for housing data processing systems without departing from embodiments disclosed herein.

Enclosure 110 may include any number of bays for sub-enclosures such as, for example, server chassis sleds (e.g., sleds 102), internal blocks, and/or other structures in which various portions of hardware resources may be positioned. In an embodiment, a hardware resource portion positioned in a sub-enclosure operates as an independent computing device, but may depend on services provided by system hardware 104 and shared with other hardware resource portions positioned in other sub-enclosures. Enclosure 110 may include any number of sub-enclosures that each include computing devices that operate independently and/or cooperatively to provide the computer implemented services.

While the system of FIG. 1 has been illustrated as including a limited number of specific components, a system may include different numbers, types, and/or quantities of components without departing from the embodiments disclosed herein.

Figure 2A:
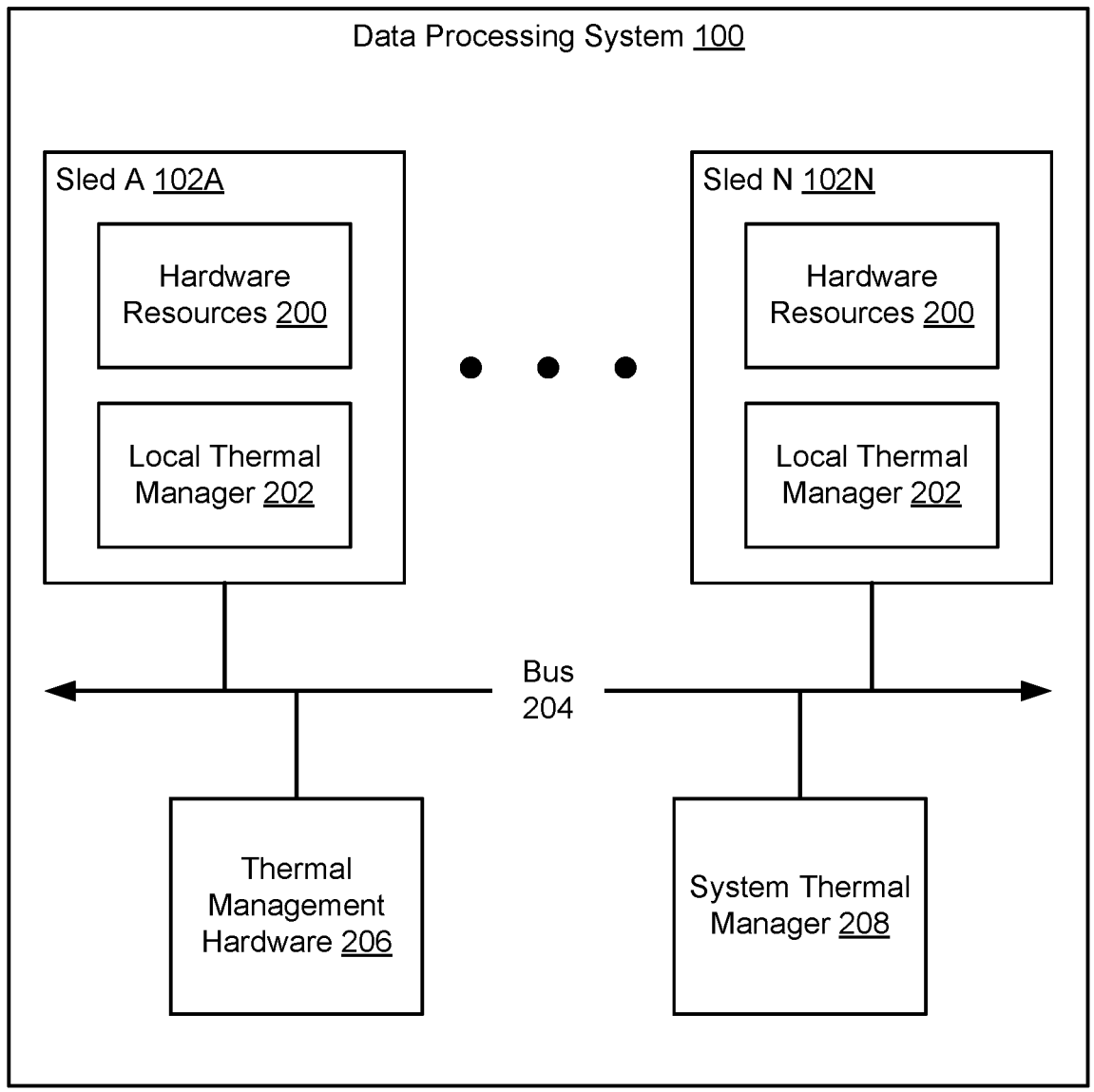
FIG. 2A shows a block diagram illustrating a data processing system in accordance with an embodiment.

Turning to FIG. 2A, a block diagram of the system shown in FIG. 1 in accordance with an embodiment is shown. As discussed above, embodiments disclosed herein may improve the likelihood of a data processing system providing computer implemented services by managing the thermal environments.

To provide the computer implemented services while managing the thermal environment, each of the sleds (e.g., 102A-102N) of data processing system 100 may include hardware resources 200 and local thermal managers 202. To manage the thermal energy generated by hardware resources 200 while operating, the local thermal manager of each sled may cooperate with system thermal manager 208 to establish and use thermal limits in the management of the system.

For example, the local thermal manager of each sled may provide information to system thermal manager 208 regarding its impact on airflow throughout data processing system 100. System thermal manager may use the information from each sled to identify the likely rate of airflow that will be available to each sled. The sleds may then use the likely rate of airflow to identify thermal limits for each sled. For example, the thermal limits may indicate a maximum temperature of airflow that may be provided to each sled that will likely retain the components within each sled within their thermal limits (e.g., for nominal operation). The local thermal managers may use these individualized thermal limits to monitor for conditions that may cause the components to exceed their thermal limits (e.g., temperatures of airflows entering the sub-enclosure of each sled exceeding the individualized thermal limits). System thermal manager 208 may use the individualized thermal limit to establish a thermal limit for the data processing system in aggregate.

Figure 2B:
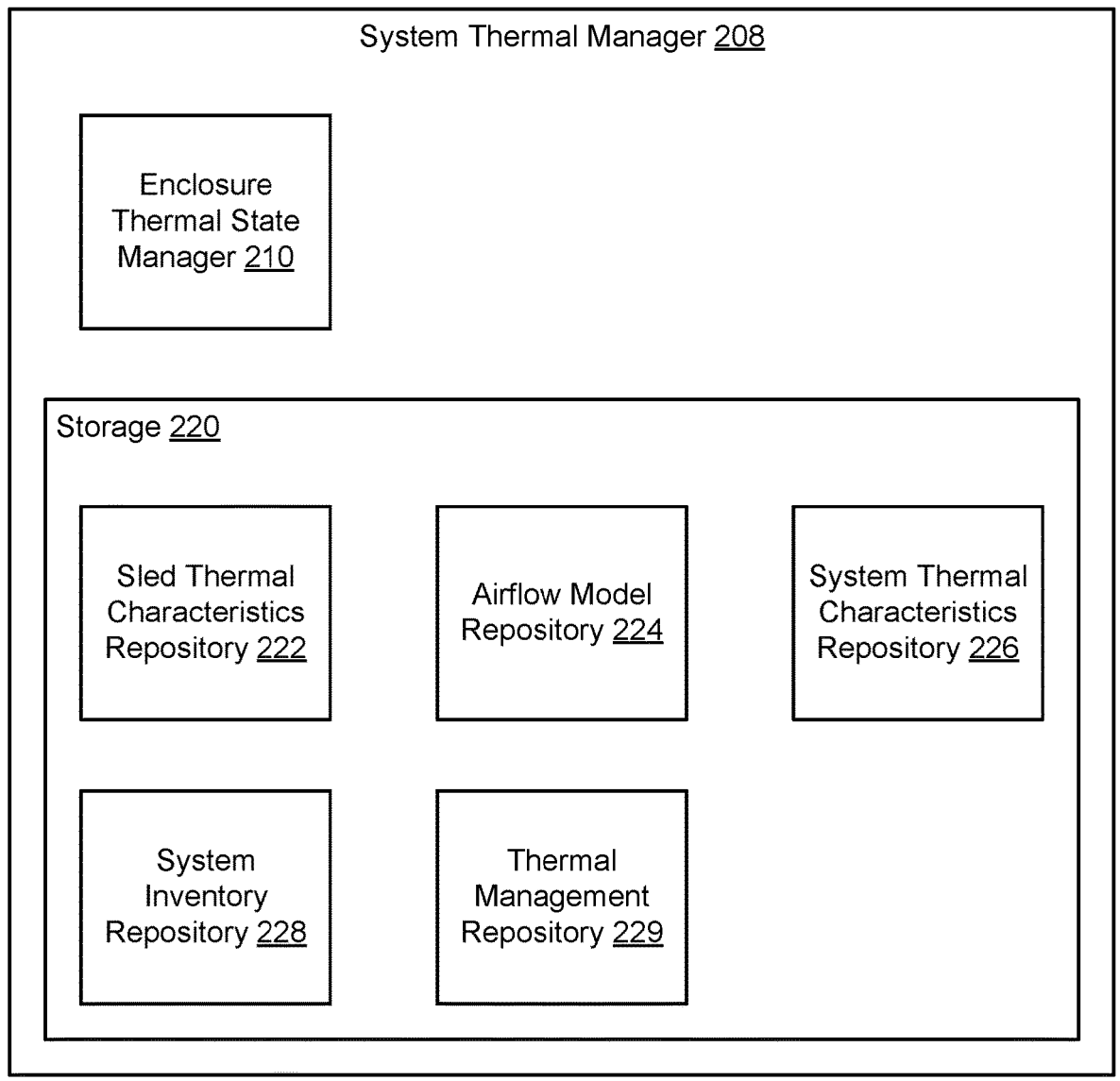
FIG. 2B shows a block diagram illustrating a system thermal manager in accordance with an embodiment.
Figure 2C:
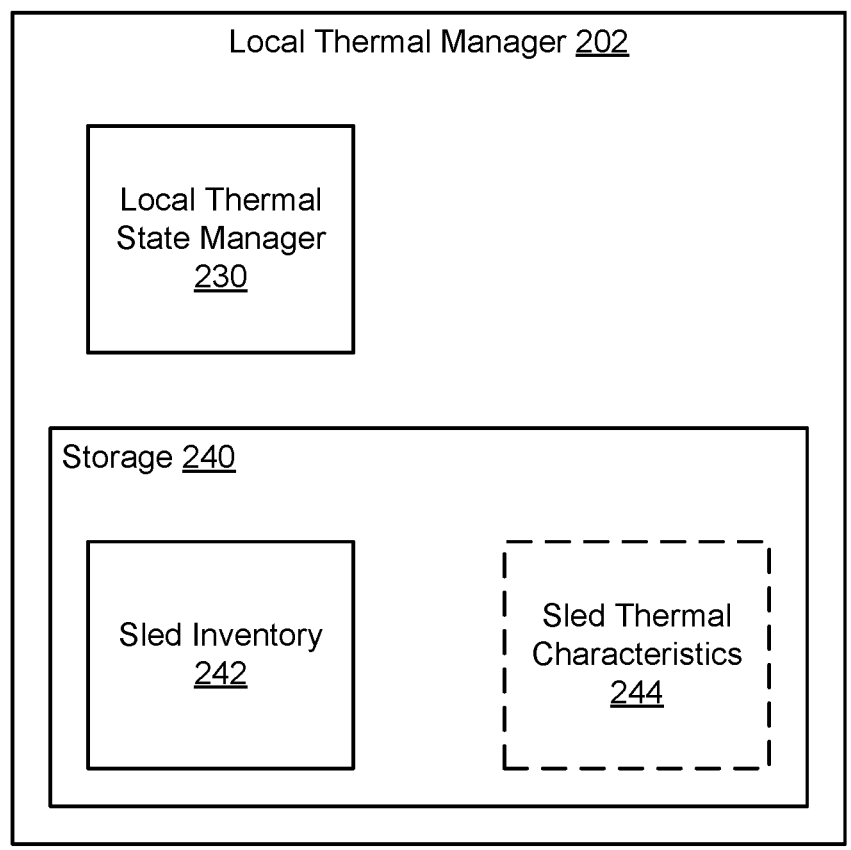
FIG. 2C shows a block diagram illustrating a local thermal manager in accordance with an embodiment.

While not illustrated in FIG. 2A, each sled may also include, for example, sensors for monitoring the temperature of components and/or airflow within a sled. As will be discussed in greater detail below, the local thermal manager of each sled may utilize information obtained from the sensors to manage the local thermal environment of each sled. Refer to FIGS. 2B-2C for additional details regarding system thermal manager 208 and local thermal manager 202, respectively.

Thermal management hardware 206 may include any quantity and type of device for managing thermal environment. For example, thermal management hardware 206 may include fans or other type of airflow management devices, sensors for measuring temperatures, etc. These components may be positioned within enclosure 110 to establish airflow within enclosure 110 and/or monitor temperatures of gasses that are taken into enclosure 110, temperatures of the airflows, temperatures of exhaust gasses, etc.

System thermal manager 208 may manage and/or utilize thermal managements hardware 206.

Bus 204 may include one or more physical devices for operably connecting components of data processing system 100. Bus 204 may include, for example, any number of data buses (analog and/or digital) over which data sent between the components of data processing system 100. The data buses may facilitate, for example, direct communications, side band communications, interrupt communications, and/or other types of communication schemes and/or standards.

Hardware resources 200, as discussed above, may include any number and types of hardware devices that may facilitate computer implemented services. Hardware resources 200 may include functionality to modify their power consumption to dynamically change the quantity of power being consumed (e.g., which may dictate the rate of thermal generation by these components), and/or (ii) throttle their performance to substantially reduce power being consumed.

While the system of FIG. 2A has been illustrated as including a limited number of specific components, a system may include different numbers, types, and/or quantities of components without departing from the embodiments disclosed herein.

Turning to FIG. 2B, a diagram of system thermal manager 208 in accordance with an embodiment is shown. As discussed above, system thermal manager 208 may provide system level thermal management services. To provide its functionality, system thermal manager 208 may include enclosure thermal state manager 210 and storage 220. Each of these components is discussed below.

Enclosure thermal state manager 210 may provide the system level thermal management services. To do so, enclosure thermal state manager 210 may: (i) inventory thermal management hardware, (ii) obtain thermal information packages from the local thermal managers of each sled, (iii) use the thermal information packages to identify the likely rate of airflow that will be provided to each sled, (iv) distribute the likely airflow rate information to the local thermal manager of each sled, (v) obtain thermal limits from the local thermal managers of the sleds, the thermal limits being obtained by the local thermal managers using the likely airflow rate information, (vi) identify system level thermal limits based on the thermal limits of each sled, and (v) use the system level thermal limits to manage the thermal state of the data processing system by performing various actions (e.g., remedial actions to respond to conditions that may otherwise cause the temperatures of various components to exceed thermal limits).

For example, the enclosure thermal state manager 210 may (i) monitor the temperatures of various components and manage the operating points of airflow control devices to maintain the temperatures of the components and (ii) monitor the temperatures of inlet gasses to ascertain whether it is possible to maintain the temperatures of the components using the gasses based on the system thermal limits. If the inlet gasses exceed the system thermal limits, then enclosure thermal state manager 210 may perform remedial actions to attempt to manage the thermal state of the components of the data processing system which may not be sufficiently managed using the airflow which may be generated by the thermal management hardware of the data processing system.

In an embodiment, enclosure thermal state manager 210 is implemented using a hardware device including circuitry. The hardware device may be, for example, a digital signal processor, a field programmable gate array, or an application specific integrated circuit. The circuitry may be adapted to cause the hardware device to perform the functionality of enclosure thermal state manager 210. Enclosure thermal state manager 210 may be implemented using other types of hardware devices without departing embodiment disclosed herein.

In one embodiment, enclosure thermal state manager 210 is implemented using a processor adapted to execute computing code stored on a persistent storage that when executed by the processor performs the functionality of enclosure thermal state manager 210 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, enclosure thermal state manager 210 performs all, or a portion, of the methods and/or actions illustrated in FIGS. 3A-4B when providing its functionality.

In an embodiment, storage 220 is implemented using physical devices that provide data storage services (e.g., storing data and providing copies of previously stored data). The devices that provide data storage services may include hardware devices and/or logical devices. For example, storage 220 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 220 may include a memory device (e.g., a dual in line memory device) in which data is stored and from which copies of previously stored data are provided. In another example, storage 220 may include a persistent storage device (e.g., a solid-state disk drive) in which data is stored and from which copies of previously stored data is provided. In a still further example, storage 220 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 220 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 220 may store data structures including sled thermal characteristics repository 222, airflow model repository 224, system thermal characteristics repository 226, system inventory repository 228, and/or thermal management repository 229. Each of these data structures is discussed below.

Sled thermal characteristics repository 222 may be implemented with one or more data structures that include any type and quantity of information regarding the thermal characteristics of sleds. The information may be obtained from the local thermal managers of sleds.

The information obtained may varying depending on the type of sled. For example, some sleds may include some quantity of information regarding their impedance to the flow of gasses, while others do not include such information. Consequently, the information from a sled may include (i) types and quantities of hardware resources of the sled, (ii) topology information of the sled (e.g., shape, size, inlet/outlet geometries for airflow, etc.), and/or (iii) a RAI for the sled.

Airflow model repository 224 may be implemented with one or more data structures that include any type and quantity of information usable to identify the likely airflow rate (e.g., maximum) that will be available to each sled. Generally, airflow model repository 224 may include two types of airflow models (i) predictive models that take into account the RAI of each sled and (ii) predictive models that do not take into account the RAI of each sled. Because not all local thermal managers may be able to provide RAIs, the predictive models that do not take into account the RAI of each sled may be used when such information is not available for one or more of the sleds. These models may, for example, use a worst case scenario assumption regarding the RAI of each of the sleds to identify that maximum airflow rate that will likely be provided to each sled. Generally, the predictive models that take into account the RAI of each sled may predict higher airflow rates while the models that do not take into account the (self-reported) RAI of each sled may predict lower airflow rates. Consequently, the airflow rates predicted using the latter type of model may be more conservative in their estimates.

These models may take, as input, information from sled thermal characteristics repository 222 and output the likely airflow rate of each sled. The models may be implemented using any type of model without departing from embodiments disclosed herein. For example, some models may be implemented using lookup tables that provide the likely airflow rates as a function of information included in sled thermal characteristics repository 222. The airflow model repository 224 may also take into account information included in system thermal characteristics repository 226.

System thermal characteristics repository 226 may be implemented with one or more data structures that include any quantity and type of information regarding the thermal characteristics of the data processing system. For example, system thermal characteristics may include information regarding the thermal management components that may be used to generate flows of gasses. The information included in system thermal characteristics repository 226 may be obtained, for example, based on an inventory of the data processing system, which may be included in system inventory repository 228.

For example, the inventory of the data processing system may be used to calculate pressures or other quantifications regarding the impact of fans or other airflow control devices. This information may also be used as input to the airflow models of airflow model repository 224 to calculate the likely airflow rates that will be provided to each of the sleds.

System inventory repository 228 may be implemented with one or more data structures that include any quantity and type of information regarding the components of a data processing system. In an embodiment, system inventory repository 228 includes information regarding the thermal management components of a data processing system. This information may be obtained by inventorying the physical components of a data processing system (e.g., which may be performed using communications via a bus). The inventory may be performed, for example, when a data processing system is started, when a component (e.g., a sled) is added/removed/replaced, and/or at other points in time. Upon the occurrence of such events, the thermal limits of the system may be recalculated (immediately in response to the change, or at a later point in time which may be more convenience such as during a power cycling).

Thermal management repository 229 may be implemented with one or more data structures that include any quantity and type of information regarding (i) the likely airflow rates (e.g., maximum) that will be provided to sleds, (ii) thermal limits of each sled, and/or (iii) system thermal limits. The airflow rates may be obtained using the airflow models of thermal management repository. The thermal limits of each sled may be obtained from the sleds. The system thermal limits may be obtained based on the thermal limits of the sleds.

In an embodiment, the thermal limits of the sleds and/or system thermal limits indicate: (i) maximum inlet airflow temperatures (e.g., to the respective sleds and/or system as a whole) and (ii) actions to be performed based on degrees to which the airflow temperatures exceed these maximum inlet airflow temperatures. The actions may specify, for example, one or more actions to be performed. The actions may include one or more of (i) sending alerts to various management entities (e.g., software and/or persons such as administrators), (ii) decreasing the thermal generation rate of various components (e.g., portions of hardware resource), (iii) disabling various components (e.g., portions of hardware resources), (iv) sending requests to management entities to reduce the temperature of gasses being provided to data processing systems for cooling purposes, and/or (v) other actions that may reduce the impact of thermal limits of hardware components being exceeded.

While various data structures have been illustrated and described in FIG. 2B with specific structures, any of the data structures may be implemented with different structures (e.g., lists, tables, linked lists, databases, etc.), stored in different locations, and/or spanned across any number of devices without departing from embodiments disclosed herein.

As noted above, while system thermal manager 208 may manage the system level thermal environment, it may do so in cooperation with local thermal managers. By doing so, highly customizable data processing systems may be provided (e.g., by adding/removing/replacing sleds) while managing the thermal environments inside these highly customizable data processing systems.

While illustrated in FIG. 2B with a limited number of specific components, a system thermal manager may include additional, fewer, and/or different components without departing from embodiments disclosed herein.

Turning to FIG. 2C, a diagram of local thermal manager 202 in accordance with an embodiment is shown. As discussed above, local thermal manager 202 may provide sled level thermal management services. To provide its functionality, local thermal manager 202 may include local thermal state manager 230 and storage 240. Each of these components is discussed below.

Local thermal state manager 230 may provide the sled level thermal management services. To do so, local thermal state manager 230 may: (i) inventory hardware resources of a sled, (ii) obtain a thermal information package for the sled based on the hardware resources inventory, (iii) provide the thermal information package to a system thermal manager, (iv) obtain an airflow rate (e.g., maximum) which will likely be provided to the sled, the airflow rate being calculated by the system thermal manager based on thermal information packages obtained from the sleds, (v) obtain thermal limits for the sleds based on the airflow rate for the sled, (vi) provide the thermal limits for the sled to the system thermal manager so that the system thermal manager may identify system level thermal limits, and (v) use the thermal limits for the sled to manage the thermal state of the sled by performing various actions (e.g., remedial actions to respond to conditions that may otherwise cause the temperatures of various components of the sled to exceed thermal limits).

For example, the local thermal state manager 230 may (i) monitor the temperatures of various components of the sled and manage the operating points of airflow control devices to maintain the temperatures of the components (e.g., by cooperating with the system thermal manager which may set the operating point of the airflow control components) and (ii) monitor the temperatures of inlet gasses to the sled to ascertain whether it is possible to maintain the temperatures of the components of the sled using airflow based on the thermal limits of the sled. If the inlet gasses exceed the thermal limits of the sled, then local thermal state manager 230 may perform remedial actions to attempt to manage the thermal state of the components of the sled which may not be sufficiently managed using the airflow which may be generated by the thermal management hardware of the data processing system.

In an embodiment, local thermal state manager 230 is implemented using a hardware device including circuitry. The hardware device may be, for example, a digital signal processor, a field programmable gate array, or an application specific integrated circuit. The circuitry may be adapted to cause the hardware device to perform the functionality of local thermal state manager 230. Local thermal state manager 230 may be implemented using other types of hardware devices without departing embodiment disclosed herein.

In one embodiment, local thermal state manager 230 is implemented using a processor adapted to execute computing code stored on a persistent storage that when executed by the processor performs the functionality of local thermal state manager 230 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, local thermal state manager 230 performs all, or a portion, of the methods and/or actions illustrated in FIGS. 3A-4B when providing its functionality.

In an embodiment, storage 240 is implemented using physical devices that provide data storage services (e.g., storing data and providing copies of previously stored data). The devices that provide data storage services may include hardware devices and/or logical devices. For example, storage 240 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 240 may include a memory device (e.g., a dual in line memory device) in which data is stored and from which copies of previously stored data are provided. In another example, storage 240 may include a persistent storage device (e.g., a solid-state disk drive) in which data is stored and from which copies of previously stored data is provided. In a still further example, storage 240 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 240 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 240 may store data structures including sled inventory 242, and/or sled thermal characteristics 244. Each of these data structures is discussed below.

Sled inventory 242 may be implemented with one or more data structures that include any quantity and type of information regarding the components of a sled. In an embodiment, sled inventory 242 includes information regarding the hardware resources in sled. The information may include, for example, types and quantities of hardware devices (e.g., processors, memory modules, etc.), the location/orientation of the hardware devices, etc. The information may be obtained by performing an inventory of the sled.

Sled inventory 242 may also include information, for example, regarding the thermal sensitivities of each of the hardware resources. The thermal sensitivities may indicate, for example, rates of airflow and corresponding maximum temperatures of the airflows which may be used to maintain nominal operation of various portions of the hardware resources. For example, for a given hardware resources, sled inventory 242 may specify, as a function of airflow temperature, a minimum required airflow rate. The aforementioned relationship may be specified as a table. In some embodiments, the table may be discretized with each row corresponding to an airflow temperature and the data in the row indicating the corresponding minimum airflow rate. The aforementioned information may be obtained, for example, from a lookup table or other data structure stored locally (e.g., in storage 240), or may be obtained from another device based on the identities of the respective hardware resources.

Sled thermal characteristics 244 may be implemented with one or more data structures that include any quantity and type of information regarding the impact that a sled may have on the thermal state of a data processing system. For example, sled thermal characteristics 244 may include a RAI for the sled. The RAI may be, for example, stored in storage 240 (e.g., at the factory or production center). Sled thermal characteristics 244 may include other types of information that may be used to indicate the impact that the sled may have on the thermal environment of a data processing system.

In FIG. 2C, sled thermal characteristics 244 is drawn with a dashed outline to indicate that not all local thermal managers may have access to such information. Consequently, when local thermal state manager 230 obtains a thermal information package for the sled, the thermal information package may or may not include the RAI for the sled.

While various data structures have been illustrated and described in FIG. 2C with specific structures, any of the data structures may be implemented with different structures (e.g., lists, tables, linked lists, databases, etc.), stored in different locations, and/or spanned across any number of devices without departing from embodiments disclosed herein.

While illustrated in FIG. 2B with a limited number of specific components, a local thermal manager may include additional, fewer, and/or different components without departing from embodiments disclosed herein.

In an embodiment, local thermal manager 202 is implemented using a management controller operably connected to the hardware resources of a sled. The management controller may operate independently from the hardware resources. For example, the management controller may present itself as a separate device and/or network end point from that of the hardware resources of the sled. The management controller may include functionality to, or example, (i) control the operation of the hardware resources (e.g., manage power consumption/performance), (ii) communication with other entities, and/or (iii) perform other types of independent actions. The hardware resources may not include functionality to control the operation of the management controller, but may be able to communicate with it.

Figure 3A:
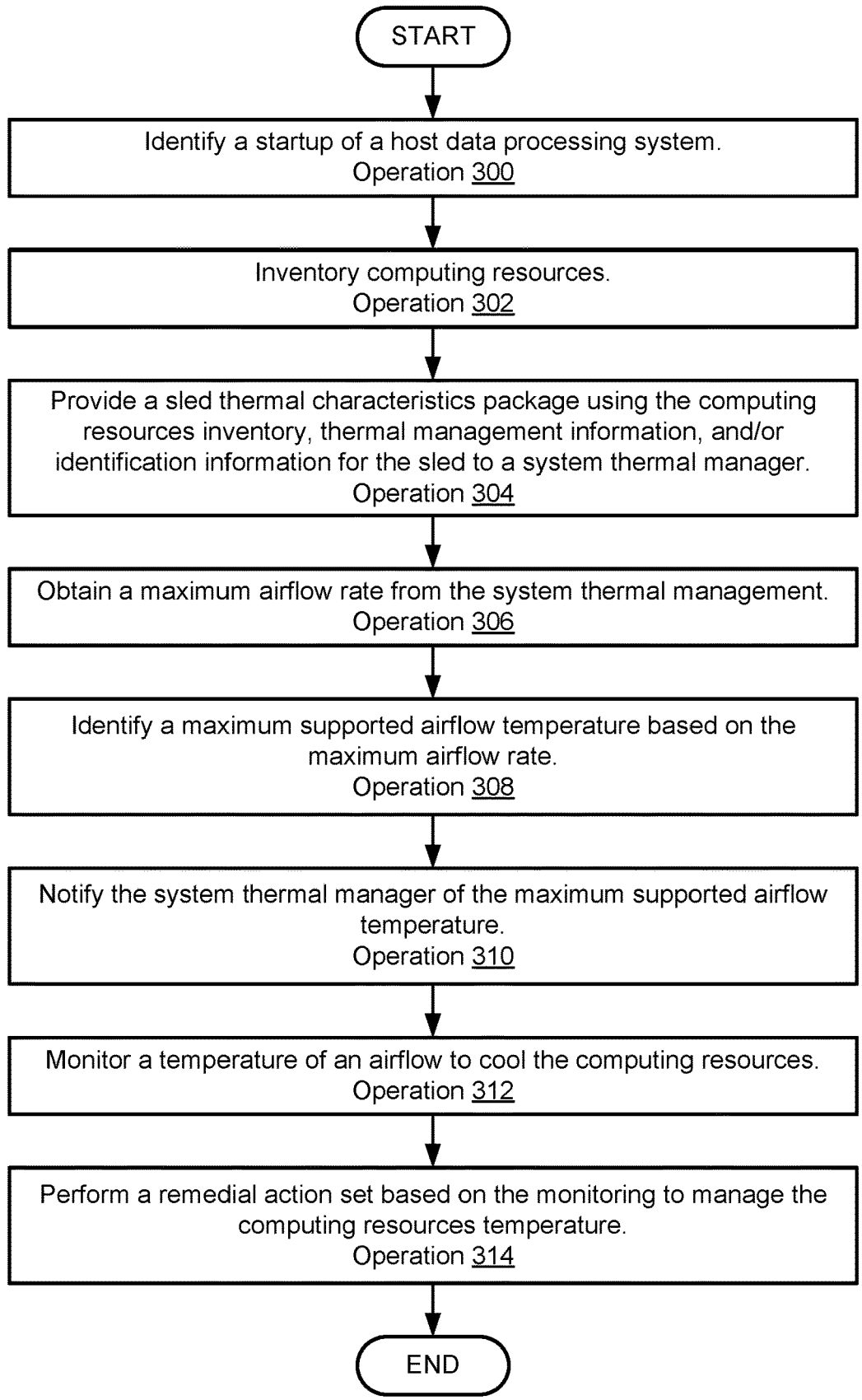
FIG. 3A shows a flow diagram illustrating a method of performing sled-level thermal management in accordance with an embodiment.
Figure 3B:
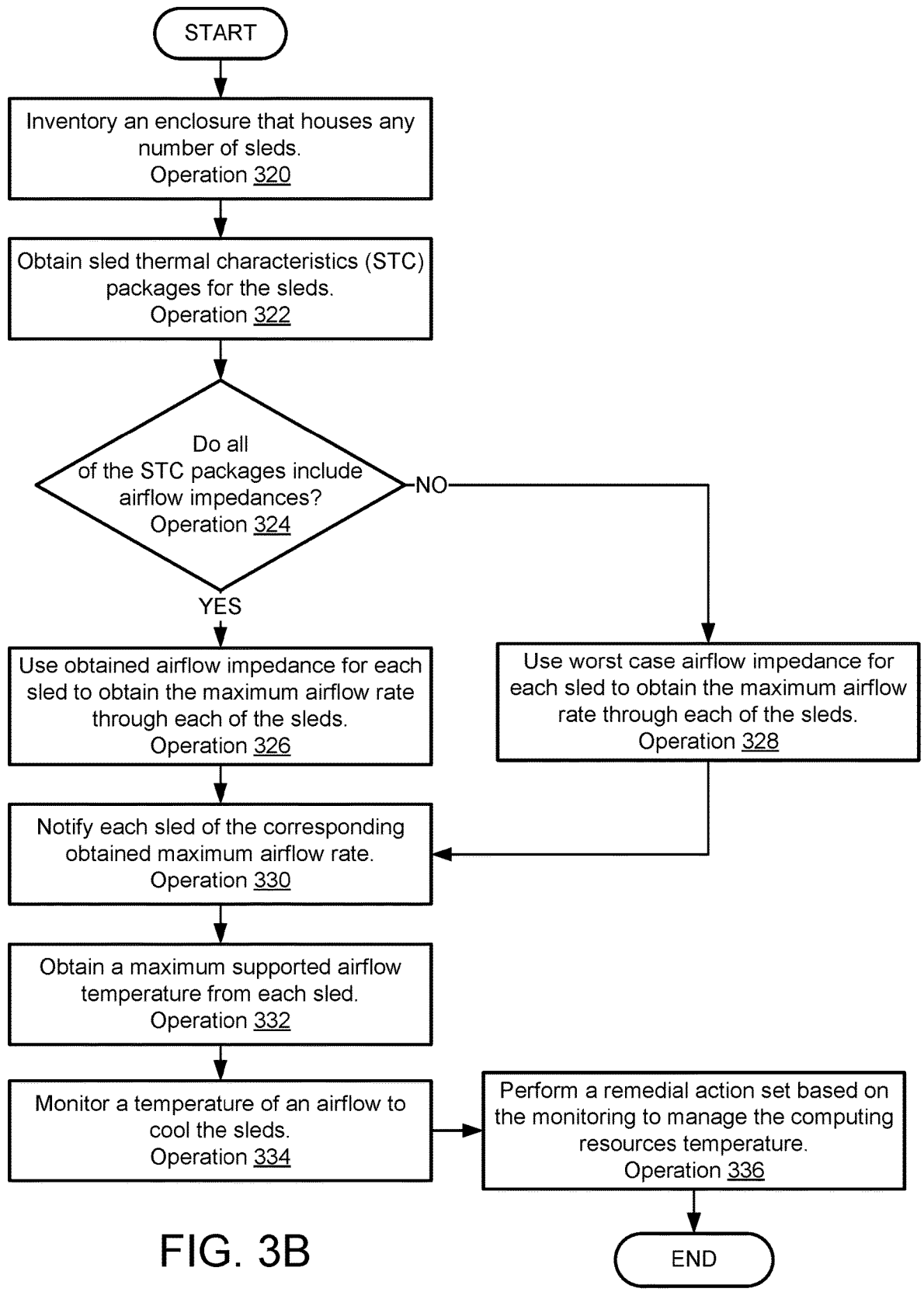
FIG. 3B shows a flow diagram illustrating a method of performing system-level thermal management in accordance with an embodiment.

As discussed above, the components of FIG. 1 may perform various methods to manage the thermal state of a data processing system. FIGS. 3A-3B illustrate examples of methods that may be performed by the components of FIG. 1. In the diagrams discussed below and shown in FIGS. 3A-3B, any of the operations may be repeated, performed in different orders, and/or performed in parallel with or a partially overlapping in time manner with other operations.

Turning to FIG. 3A, a flow diagram illustrating a method of managing the thermal environment in a sled of a data processing system in accordance with an embodiment is shown. The method may be performed, for example, by a local thermal manager of a sled.

At operation 300, a startup of a host data processing system is identified. The startup may be identified, for example, by identifying a power event (e.g., power on, power cycling, etc.). The identification may be performed, for example, by receiving a notification from a system thermal manager of the startup of the host data processing system. The identification may be performed via other methods without departing from embodiments disclosed herein.

At operation 302, computing resources of the sled are inventoried. The computing resources may be inventoried, for example, by performing a device discovery process. The device discovery process may identify the hardware resources of the sled. The resulting computing resource inventory may include information similar to that discussed with respect to the sled inventory 242 shown in FIG. 2C.

In an embodiment, the computing resources of the sled are inventoried by obtaining the inventory from another entity. For example, another entity (e.g., such as an operating system hosted by the hardware resources) may perform the inventory process and may provide the inventory, or information derived from the inventory, upon request.

At operation 304, a sled thermal characteristics package is provided using the computing resources inventory, thermal management information, and/or identification information for the sled. The sled thermal characteristics package may be provided to a system thermal manager of the host data processing system.

In an embodiment, the sled thermal characteristics package including information usable by the system thermal manager to identify the airflow rate that will be available to the sled. As discussed with respect to FIGS. 2B-2C, the content of the sled thermal characteristics package may vary depending on whether the local thermal manager has information such as a RAI available to it. If it has such information available to it, then it may include it in the sled thermal characteristics package. Otherwise, the sled thermal characteristics may only include information (e.g., which may help to identify the location of the sled in the data processing system, the form factor of the sled, etc.) such as the identification information and/or computing resources related information.

The sled thermal characteristics package may be provided to the system thermal manager by sending it via a bus.

At operation 306, a maximum airflow rate for the sled is obtained from the system thermal manager. For example, the system thermal manager may use the sled thermal characteristics package (and/or other information) to calculate the maximum airflow rate that may be provided to the sled. As discussed above, the maximum airflow rate calculation may depend on the content of the sled thermal characteristics package.

The maximum airflow rate may be obtained by receiving it via the bus.

At operation 308, a maximum supported airflow temperature is identified based on the maximum airflow rate.

In an embodiment, the maximum supported airflow temperature is identified by identifying the highest temperature that is supported by all of the computing resources of the sled at the maximum airflow rate.

For example, consider a scenario where a sled includes a processor and a memory. The processor may indicate that it is nominally operational down to an airflow rate of 25 cubic feet per minute (CFM) when the airflow has a temperature of 25° Celsius, and an airflow rate of 36 CFM when the airflow has a temperature of 30° Celsius. In contrast, the memory module may indicate that it is nominally operational down to an airflow rate of 22 CFM when the airflow has a temperature of 25° Celsius, and an airflow rate down to 38 CFM when the airflow has a temperature of 30° Celsius. Consequently, the local thermal manager may determine that the sled is nominally operational down to an airflow rate of 25 CFM when the airflow has a temperature of 25° Celsius, and an airflow rate of 38 CFM when the airflow has a temperature of 30° Celsius. In other words, for different temperatures ranges (e.g., every 5 degree increments) the local thermal manager may identify the minimum airflow rate that will still result in nominal operation of all of the hardware resources in the sled.

Continuing with the example, if the maximum airflow rate obtained from the thermal manager is 37 CFM, then the local thermal manager may identify that the maximum supported airflow temperature is 25° Celsius (even though the processor indicates that it may nominally operate at an airflow temperature of 30° Celsius). In contrast, if the maximum airflow rate obtained from the thermal manager is 38 CFM, then the local thermal manager may identify that the maximum supported airflow temperature is 30° Celsius (e.g., since both the processor and memory indicate that they operate nominally at 30° Celsius with an airflow rate of 38 CFM).

The identified maximum supported airflow temperature may be used as a thermal limit for management purposes, as discussed below.

At operation 310, the system thermal manager is notified of the maximum supported airflow temperature. The system thermal manager may be notified by, for example, sending the maximum supported airflow temperature to the thermal manager, storing the maximum supported airflow temperature at a predetermined location (e.g., which may be local or remote to the local thermal manager), or via other methods.

At operation 312, a temperature of an airflow to cool the computing resources is monitored. The monitoring may be performed based on the maximum supported airflow temperature. For example, a sensor may be used to monitor the temperature of airflow as it enters the sled.

At operation 314, a remedial action set (e.g., a sled level remedial action set) is performed based on the monitoring to manage the computing resources temperature. The remedial action set may be performed in response to the temperature of the airflow as it enters the sled exceeding the maximum supported airflow temperature.

The actions of the action set may depend on the degree to which the temperature of the airflow exceeds the maximum supported airflow temperature. For example, the action set may indicate a severity level of an alert sent as part of the remedial action set based on the degree of excess. The actions of the action set may also include, for example, reducing the thermal generation rate by the hardware resources, requesting increased airflow rates, and/or any other type and quantity of actions that may be performed to reduce an impact of a hardware resource exceeding it thermal limits.

The method may end following operation 314.

Using the method illustrated in FIG. 3A, a local thermal manager may manage the thermal environment within a sled. When doing so, the local thermal manager may coordinate its operation with a system thermal manager so that its action is in concert with those performed by other local thermal managers of other sleds.

Turning to FIG. 3B, a flow diagram illustrating a method of managing the thermal environment in a data processing system in accordance with an embodiment is shown. The method may be performed, for example, by a system thermal manager.

At operation 320, an enclosure that houses any number of sleds is inventoried. The enclosure may be inventoried by, for example, identifying the thermal management components available in the enclosure. For example, the number and types of fans may be identified, and the airflow generation capabilities of those components may be identified.

At operation 322, sled thermal characteristics (STC) packages for the sleds are obtained. The STC packages may be obtained by receiving them from the respective sleds. Refer to operation 304 of FIG. 3A for additional details regarding the STC packages.

At operation 324, a determination is made regarding whether all of the STC packages include RAIs for the respective sleds. The determination may be made based on the content of the respective STC packages (e.g., which may or may not include RAIs).

If all of the STC packages include RAIs, then the method may proceed to operation 326. Otherwise, the method may proceed to operation 328.

At operation 326, the obtained RAIs for each sled are used to obtain a maximum airflow rate for each of the sleds. The determination may be made, for example, by using the RAIs and other information (e.g., such as the airflow generation characteristics of the fans, refer to operation 320) as input to an airflow model. The airflow model may take into these granular, specific characteristics of the sleds to calculate the likely maximum airflow rates that will be available to the sleds.

At operation 330, each sled is notified of the corresponding obtained maximum airflow rate. Different sleds may be notified of different and/or similar rates, depending on the characteristics of the sleds.

At operation 332, a maximum supported airflow temperature for each sled is obtained. The maximum supported airflow temperature may be obtained by receiving it from the respective sled. As noted above, the respective sleds may use the corresponding maximum airflow rate to calculate it maximum airflow temperature. The maximum supported airflow temperature may be obtained via other methods. For example, while the system thermal manager and local thermal managers have been described as performing different calculations, either manager may perform any of the calculations by aggregating the data upon which the calculations (e.g., to obtain the maximum airflow rate and maximum airflow temperature) are performed in the system thermal manager or any of the local thermal managers.

At operation 334, a temperature of an airflow to cool the sleds is monitored. The temperature of the airflow may be monitored using one or more sensors to identify the temperature of the airflow when it enters the enclosure of the data processing system (e.g., which may be treated as the ambient temperature of the environment around the data processing system).

The monitoring may be performed by, for example, using the lowest maximum supported airflow temperature from those supported by each sled. This temperature may be treated as a system thermal limitation whereas the maximum supported airflow temperature of a sled may be treated as a local thermal limitation.

At operation 336, a remedial action set (e.g., a system level remedial action set) is performed based on the monitoring to manage the temperatures of the computing resources of the sleds. The remedial action set may be performed in response to the temperature of the airflow as it enters the enclosure exceeding the system thermal limit.

The actions of the action set may depend on the degree to which the temperature of the airflow exceeds the system thermal limit. For example, the action set may indicate a severity level of an alert sent as part of the remedial action set based on the degree of excess of the system thermal limit. The actions of the action set may also include, for example, reducing the thermal generation rate by the hardware resources of the sleds, reduction of the temperature of the ambient environment (e.g., from a data center manager, or other management entity), and/or any other type and quantity of actions that may be performed to reduce an impact of the temperature of the data processing system exceeding its limits.

In an embodiment, the actions of the action set may be identified using a lookup table. For example, the lookup table may include entries associated with different deltas between the temperature of the airflow into the enclosure and the system thermal limit. The entries may specify actions to be performed based on the respective temperature delta.

The method may end following operation 336.

Returning to operation 324, the method may proceed to operation 328 following operation 324 when at least one of the STC packages does not include an airflow impedance.

At operation 328, a worst case airflow impedance for each sled is used to obtain the maximum airflow rate through each of the sled. Similar to the processes discussed with respect to operation 326, an airflow model may be used to identify the maximum airflow rate through each of the sleds, but the airflow model may not require or take into account the RAI of each sled, and may perform a conservative estimation process so that the actual provided maximum airflow will at least meet the obtained maximum airflow rate.

The method may proceed to operation 330 following operation 328, and following the previously discussed steps until ending following operation 336.

Figure 4A:
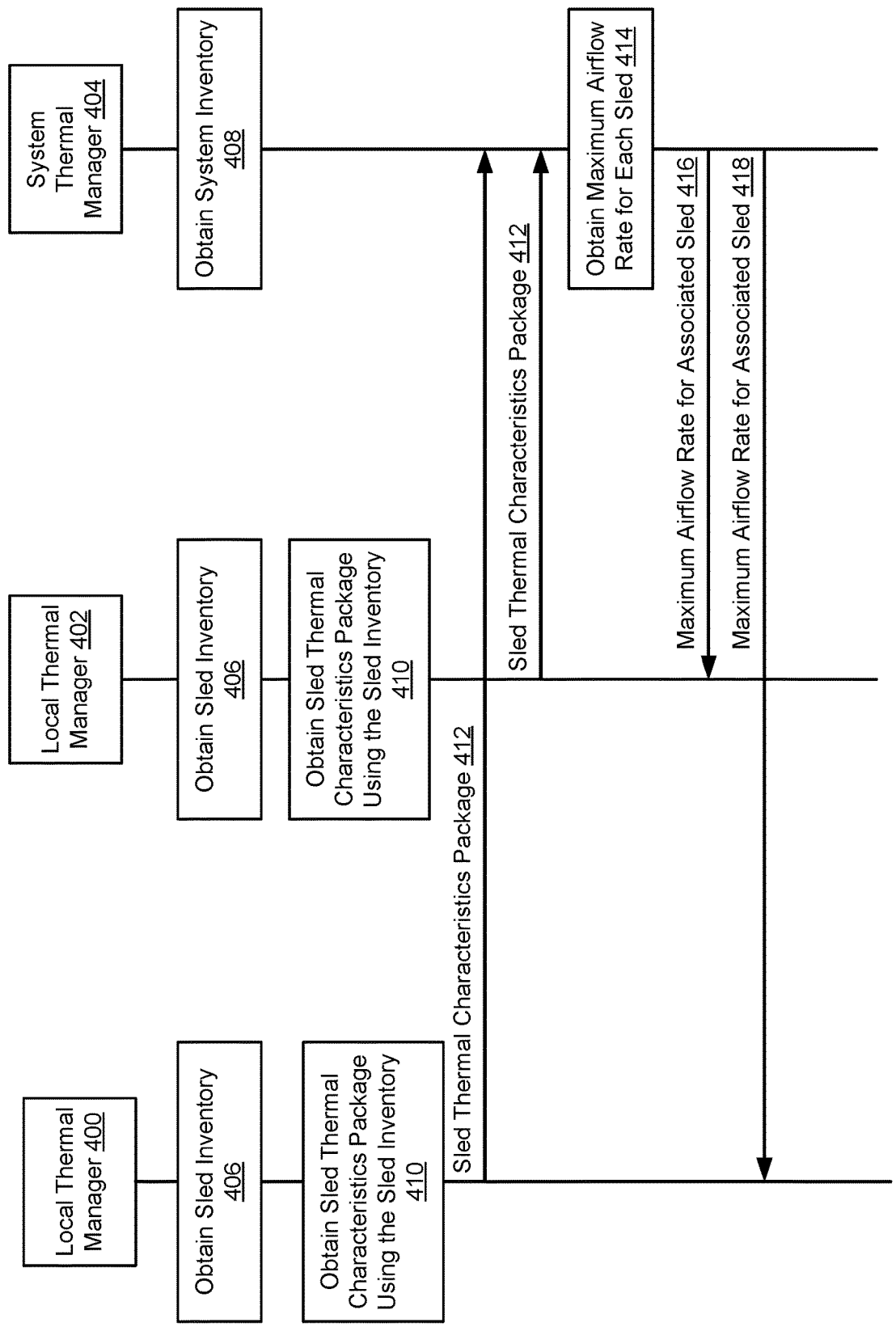
FIGS. 4A-4B show diagrams illustrating an example of system operation over time in time in accordance with an embodiment.
Figure 4B:
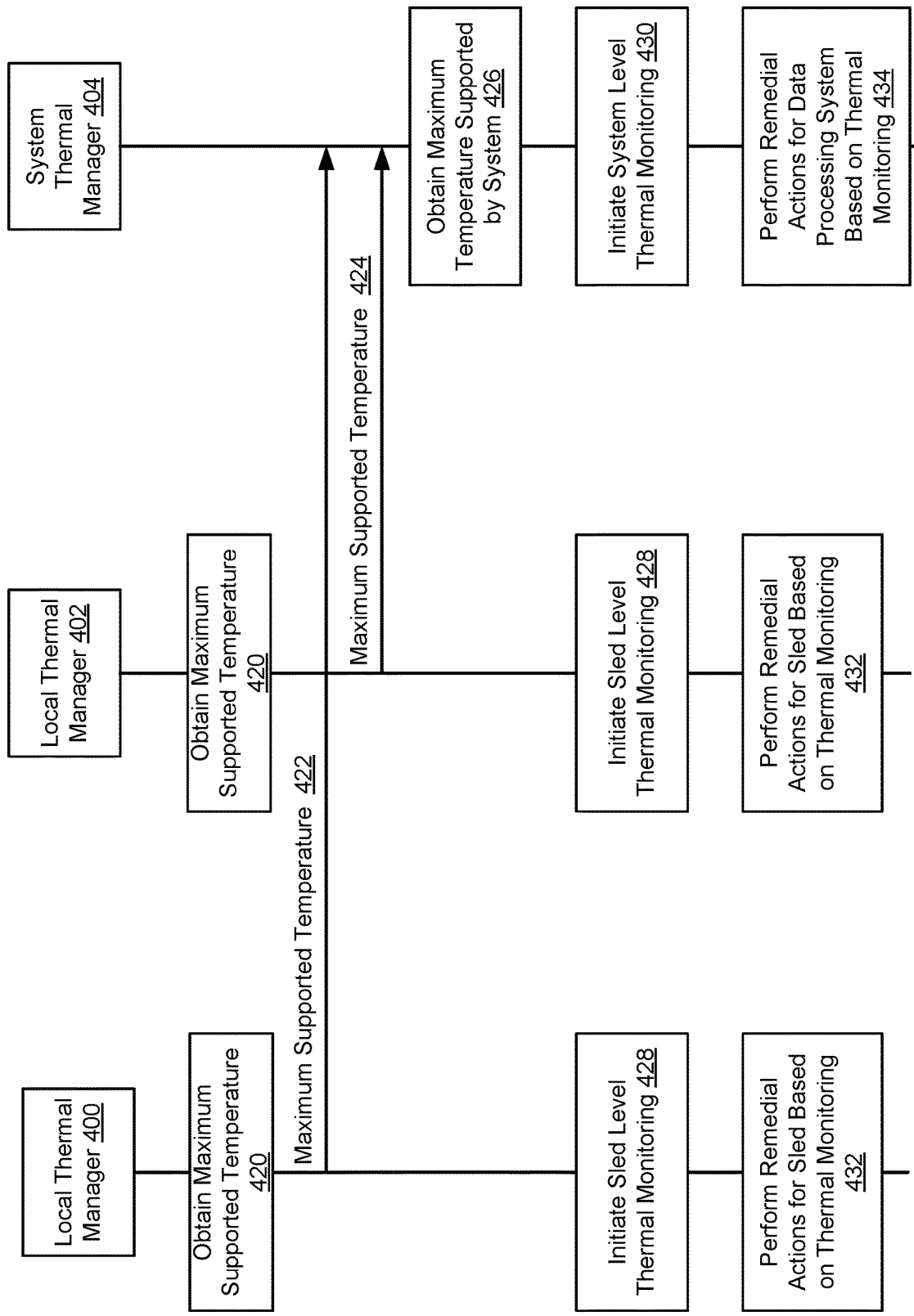

To further clarify embodiments disclosed herein, diagrams illustrating example actions and interactions in a system similar that that shown in FIG. 1 are illustrated in FIGS. 4A-4B. These figures illustrate, in part, an example system which may include two local thermal manager 400, 402 of two sleds of a data processing system, and a system thermal manager 404 of the data processing system. In these figures, actions performed by the respective components are shown with boxes positioned over the lines extending downward on the page from the blocks representing the local thermal managers 400, 402 and system thermal manager 404. Interactions between these components such as data transmission are illustrated with arrows between the lines extending downward on the page. The actions and interactions are generally temporally order from earlier to later performed actions from top to bottom of the page. However, the actions may be performed in different orders without departing from embodiments disclosed herein.

Now, consider a scenario where the data processing system powers on. In this scenario, each of the local thermal managers 400, 402 and system thermal manager 404 power on and being to cooperatively manage the thermal state of the data processing system.

To do so, each of local thermal managers 400, 402 perform actions to obtain a sled inventory 406 of the respective sleds managed by the respective local thermal managers. Similarly, system thermal manager 404 may perform actions to obtain a system inventory 408.

Once the local thermal managers 400, 402 obtain the inventories, each may perform actions to obtain sled thermal characteristics packages using the respective sled inventories 410. These sled thermal characteristics packages 412 may be provided to system thermal manager 404. At this point, system thermal manager 404 has access to information indicating the airflow generation capacity of the system via the system inventory 408 and the airflow restrictions due to the sleds via the sled thermal characteristics packages

412. Accordingly, using the airflow generation capacity and airflow restrictions, system thermal manager 404 obtains a maximum airflow rate for each sled 414. System thermal manager 404 may utilize different methods of obtaining the maximum airflow rate for each sled depending on whether RAIs are included in the sled thermal characteristics packages 412.

Once the maximum airflow rate for each sled is obtained, system thermal manager 404 distributes the maximum airflow rates 416, 418 to the respective sled.

Turning to FIG. 4B, the local thermal managers 400, 402 may use the obtained maximum flow rates to obtain respective maximum supported temperatures 420. These maximum airflow rates and maximum supported temperatures may be similar or different. The obtained maximum supported temperatures 422, 424 may then be provided to system thermal manager 404 so that system thermal manager 404 is aware of the maximum supported temperature for each of the sleds.

Using these obtained temperatures, system thermal manager 404 may obtain a maximum temperature supported by the data processing system 426 by using the lowest maximum supported by a sled as the maximum temperature supported by the system. At this point, all of the local thermal managers and system thermal manager may have access to the maximum supported thermal temperature.

For example, if the maximum supported airflow temperature obtained by local thermal manager 400 is 25° Celsius and the maximum supported airflow temperature obtained by local thermal manager 402 is 30° Celsius, then the maximum temperature supported by the data processing system may be 25° Celsius.

After the maximum supported airflow temperatures are set, the local thermal managers 400, 402 and system thermal manager 404 may initiate sled level thermal monitoring 428 and system level thermal monitoring 430, respectively.

For example, the respective thermal managers may monitor the airflow temperature at the inlet (e.g., to the sled or enclosure), and compare the temperature to the respective maximum supported temperatures.

Continuing with the above example, if the temperatures of airflow into the enclosure and sleds increases from 22° Celsius to 28°, then the system thermal manager 404 and local thermal manager 400 may proceed to perform remedial actions. In contrast, local thermal manager 402 may not proceed to perform remedial actions until the temperature of the airflow exceeds 30° Celsius.

Once the maximum supported airflow temperatures are exceeded, then the local thermal managers 400, 402 may performed remedial actions for the sleds based on the thermal monitoring 432. Likewise, the system thermal manager 404 may perform remedial actions for the data processing system based on the thermal monitoring 434 after the maximum supported airflow temperature into the enclosure of the data processing system is exceeded.

The remedial actions performed by the local thermal managers 400, 402 and system thermal manager 404 may be similar or different.

The example may end following these remedial actions.

In this manner, a distributed manner of managing the thermal state of a system in accordance with an embodiment may be provided. The distribute management method may allow for the thermal state of the system to be managed regardless of the customization and/or modification of the system over time.

Figure 5:
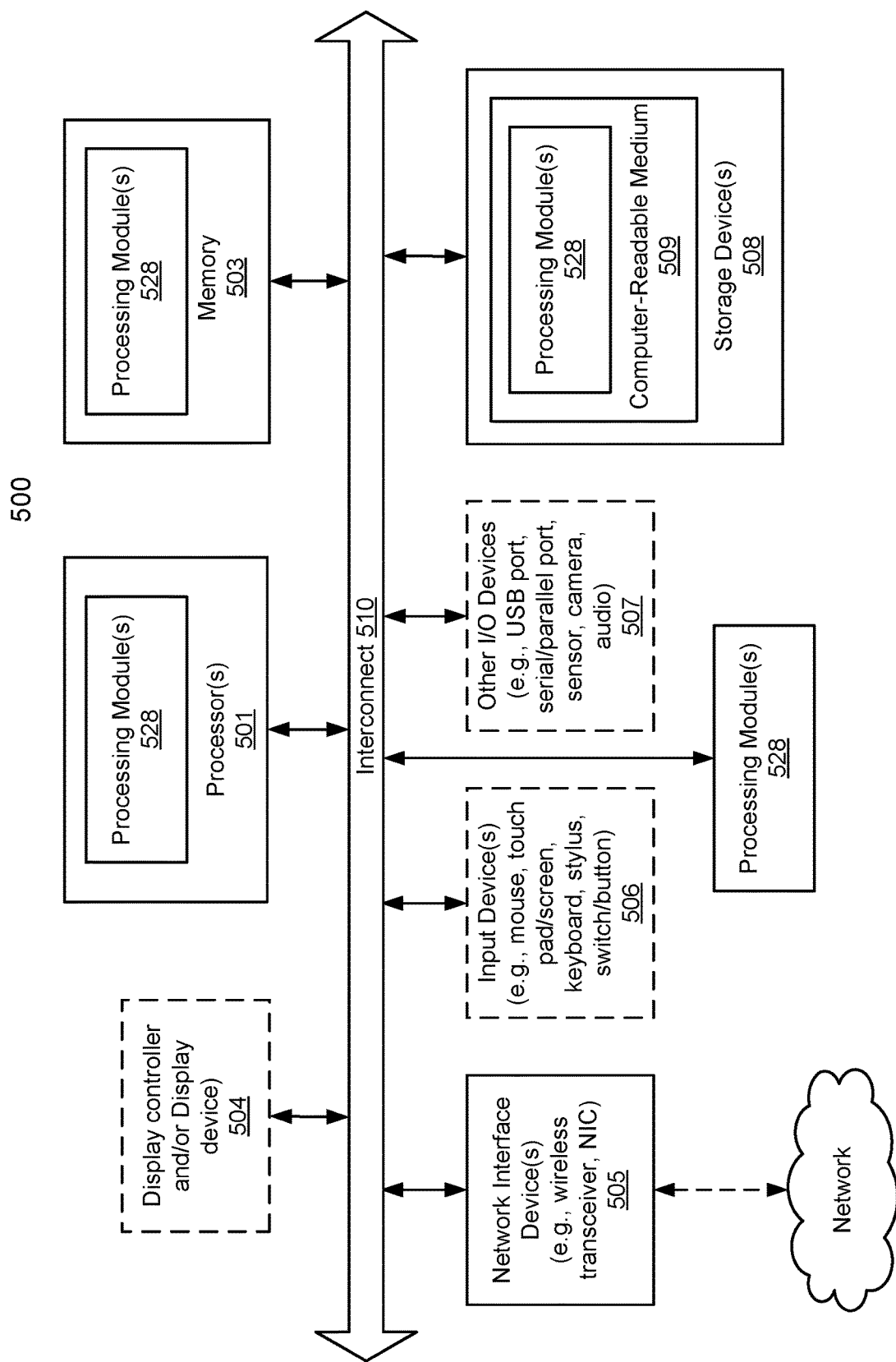
FIG. 5 is a block diagram illustrating a data processing system in accordance with an embodiment.

Any of the components illustrated in FIGS. 1-4B may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data processing system to provide computer implemented services, the data processing system comprising:
    thermal management hardware;
    a plurality of sleds, each sled of the plurality of sleds comprising:
        computing resources, and
        a local thermal manager;
    a system thermal manager adapted to:
        obtain a sled thermal characteristics package from the local thermal manager of each sled of the plurality of sleds;
        when all of the obtained sled thermal characteristics packages comprise an airflow impedance, use the airflow impedance from each of the obtained sled thermal characteristics package to identify a maximum airflow rate each sled of the plurality of sleds will receive from the thermal management hardware;
        when at least one of the obtained sled thermal characteristics packages does not comprise the airflow impedance, use a worst case airflow impedance for each sled of the plurality of sleds to identify the maximum airflow rate each sled of the plurality of sleds will receive from the thermal management hardware;
        notify the local thermal manager of each respective sled of the corresponding identified maximum airflow rate;
        obtain a maximum supported airflow temperature from the local thermal manager of each sled of the plurality of sleds, the maximum supported airflow temperature being based, at least in part, on the identified maximum airflow rate corresponding to the respective sled;
        obtain a maximum supported airflow temperature for the data processing system based on the obtained maximum supported airflow temperature from the local thermal manager of each sled of the plurality of sleds; and
        thermally manage the data processing system based on the maximum supported airflow temperature.

2. The data processing system of claim 1, wherein the local thermal manager of each sled is adapted to:
    obtain the corresponding maximum airflow rate from the system thermal manager;
    obtain the maximum supported airflow temperature for the respective sled of the plurality of sleds based on the corresponding maximum airflow rate and computing resources of the respective sled of the plurality of sleds; and
    thermally manage the respective sled of the plurality of sleds based on the maximum supported airflow temperature.

3. The data processing system of claim 2, wherein thermally managing the data processing system based on the maximum supported airflow temperature comprises:
    monitoring a temperature of airflow through the data processing system, the airflow being generated, at least in part, by the thermal management hardware; and
    performing remedial action when the temperature exceeds a first threshold.

4. The data processing system of claim 3, wherein the remedial action comprises:
    sending alerts based on a degree of the temperature exceeding the first threshold.

5. The data processing system of claim 4, wherein thermally managing the respective sled of the plurality of sleds based on the maximum supported airflow temperature comprises:
    monitoring a temperature of a portion of the airflow through the respective sled of the plurality of sleds; and
    performing sled level remedial action when the temperature of the portion of the airflow exceeds a second threshold.

6. The data processing system of claim 5, wherein the sled level remedial action comprises:
    reducing a rate of thermal generating by the computing resources of the respective sled.

7. The data processing system of claim 1, wherein the local thermal manager of each sled of the plurality of sleds comprises separate computing resources that operate independently from the computing resources of the respective sled, and the computing resources of each sled operate as an independent computing device.

8. The data processing system of claim 1, wherein each sled of the plurality of sleds comprises a sub-enclosure positioned inside of an enclosure of the data processing system, the sub-enclosures relying, at least in part, on the thermal management hardware for thermal dissipation from an interior of the respective sub-enclosure.

9. A method of thermal management by a data processing system, the method comprising:
obtaining a sled thermal characteristics package from a local thermal manager of each sled of a plurality of sleds of the data processing system;
when all of the obtained sled thermal characteristics packages comprise an airflow impedance, identifying a maximum airflow rate each sled of the plurality of sleds will receive from thermal management hardware of the data processing system using the airflow impedance from each of the obtained sled thermal characteristics packages;
when at least one of the obtained sled thermal characteristics packages does not comprise the airflow impedance, identifying the maximum airflow rate each sled of the plurality of sleds will receive from the thermal management hardware using a worst case airflow impedance for each sled of the plurality of sleds;
notifying the local thermal manager of each respective sled of the corresponding identified maximum airflow rate;
obtaining a maximum supported airflow temperature from the local thermal manager of each sled of the plurality of sleds, the maximum supported airflow temperature being based, at least in part, on the identified maximum airflow rate corresponding to the respective sled;
obtaining a maximum supported airflow temperature for the data processing system based on the obtained maximum supported airflow temperature from the local thermal manager of each sled of the plurality of sleds; and
thermally managing the data processing system based on the maximum supported airflow temperature.

10. The method of claim 9, further comprising:
obtaining, by a local thermal manager of each sled, the corresponding maximum airflow rate from the system thermal manager;
obtaining, by the local thermal manager of each sled, the maximum supported airflow temperature for the respective sled of the plurality of sleds based on the corresponding maximum airflow rate and computing resources of the respective sled of the plurality of sleds; and
thermally managing, by the local thermal manager of each sled, the respective sled of the plurality of sleds based on the maximum supported airflow temperature.

11. The method of claim 10, wherein thermally managing the data processing system based on the maximum supported airflow temperature comprises:
monitoring a temperature of airflow through the data processing system, the airflow being generated, at least in part, by the thermal management hardware; and
performing remedial action when the temperature exceeds a first threshold.

12. The method of claim 11, wherein the remedial action comprises:
sending alerts based on a degree of the temperature exceeding the first threshold.

13. The method of claim 12, wherein thermally managing the respective sled of the plurality of sleds based on the maximum supported airflow temperature comprises:
monitoring, by the local thermal manager of each sled, a temperature of a portion of the airflow through the respective sled of the plurality of sleds; and
performing, by the local thermal manager of each sled, sled level remedial action when the temperature of the portion of the airflow exceeds a second threshold.

14. The method of claim 13, wherein the sled level remedial action comprises:
reducing a rate of thermal generating by the computing resources of the respective sled.

15. The method of claim 14, wherein the local thermal manager of each sled of the plurality of sleds comprises separate computing resources that operate independently from the computing resources of the respective sled, and the computing resources of each sled operate as an independent computing device.

16. The method of claim 9, wherein each sled of the plurality of sleds comprises a sub-enclosure positioned inside of an enclosure of the data processing system, the sub-enclosures relying, at least in part, on the thermal management hardware for thermal dissipation from an interior of the respective sub-enclosure.

17. A non-transitory computer readable medium storing instructions that, when executed by a processor, cause a method for thermal management by a data processing system, the method comprising:
obtaining a sled thermal characteristics package from a local thermal manager of each sled of a plurality of sleds of the data processing system;
when all of the obtained sled thermal characteristics packages comprise an airflow impedance, identifying a maximum airflow rate each sled of the plurality of sleds will receive from thermal management hardware of the data processing system using the airflow impedance from each of the obtained sled thermal characteristics packages;
when at least one of the obtained sled thermal characteristics packages does not comprise the airflow impedance, identifying the maximum airflow rate each sled of the plurality of sleds will receive from the thermal management hardware using a worst case airflow impedance for each sled of the plurality of sleds;
notifying the local thermal manager of each respective sled of the corresponding identified maximum airflow rate;
obtaining a maximum supported airflow temperature from the local thermal manager of each sled of the plurality of sleds, the maximum supported airflow temperature being based, at least in part, on the identified maximum airflow rate corresponding to the respective sled;
obtaining a maximum supported airflow temperature for the data processing system based on the obtained maximum supported airflow temperature from the local thermal manager of each sled of the plurality of sleds; and
thermally managing the data processing system based on the maximum supported airflow temperature.

18. The non-transitory computer readable medium of claim 17, wherein the method further comprises:
obtaining, by a local thermal manager of each sled, the corresponding maximum airflow rate from the system thermal manager;
obtaining, by the local thermal manager of each sled, the maximum supported airflow temperature for the respective sled of the plurality of sleds based on the corresponding maximum airflow rate and computing resources of the respective sled of the plurality of sleds; and thermally managing, by the local thermal manager of each sled, the respective sled of the plurality of sleds based on the maximum supported airflow temperature.

19. The non-transitory computer readable medium of claim 18, wherein thermally managing the data processing system based on the maximum supported airflow temperature comprises:

monitoring a temperature of airflow through the data processing system, the airflow being generated, at least in part, by the thermal management hardware; and performing remedial action when the temperature exceeds a first threshold.

20. The non-transitory computer readable medium of claim 19, wherein the remedial action comprises:

sending alerts based on a degree of the temperature exceeding the first threshold.

* * * * *